(12) United States Patent
Simons

(10) Patent No.: US 11,689,513 B2
(45) Date of Patent: *Jun. 27, 2023

(54) BLOCKCHAIN OPERATING SYSTEM

(71) Applicant: AMERICORP INVESTMENTS LLC, Denver, CO (US)

(72) Inventor: Jordan Simons, Denver, CO (US)

(73) Assignee: Americorp Investments LLC, Denver, CO (US)

( * ) Notice: Subject to any disclaimer, the term of this patent is extended or adjusted under 35 U.S.C. 154(b) by 236 days.

This patent is subject to a terminal disclaimer.

(21) Appl. No.: 16/932,104

(22) Filed: Jul. 17, 2020

(65) Prior Publication Data

US 2020/0351258 A1 Nov. 5, 2020

Related U.S. Application Data

(63) Continuation of application No. 16/880,239, filed on May 21, 2020, now Pat. No. 10,965,661, which is a continuation of application No. 16/509,313, filed on Jul. 11, 2019, now Pat. No. 10,708,250.

(60) Provisional application No. 62/696,561, filed on Jul. 11, 2018.

(51) Int. Cl.
*H04L 9/40* (2022.01)
*G06F 9/30* (2018.01)

(52) U.S. Cl.
CPC .......... *H04L 63/08* (2013.01); *G06F 9/30003* (2013.01)

(58) Field of Classification Search
CPC ....... H04L 63/08; H04L 63/12; G06F 9/3003; G06F 9/466; G06F 9/3239; G06F 9/50
See application file for complete search history.

(56) References Cited

U.S. PATENT DOCUMENTS

| | | |
|---|---|---|
| 10,185,595 B1 * | 1/2019 | Ramatchandirane ........................ H04L 9/3236 |
| 2015/0379510 A1 | 12/2015 | Smith |
| 2017/0155515 A1 | 6/2017 | Androulaki et al. |
| 2017/0264428 A1 | 9/2017 | Seger, II |
| 2018/0150835 A1 * | 5/2018 | Hunt .................. G06Q 20/3827 |
| 2018/0174255 A1 | 6/2018 | Hunn et al. |
| 2018/0219676 A1 * | 8/2018 | Mattingly ............. H04L 63/102 |
| 2018/0227275 A1 * | 8/2018 | Russinovich ......... H04L 9/3236 |
| 2018/0352033 A1 | 12/2018 | Pacella et al. |
| 2019/0116174 A1 * | 4/2019 | Gray ..................... H04L 9/3239 |
| 2019/0121988 A1 | 4/2019 | van de Ruit et al. |

(Continued)

OTHER PUBLICATIONS

International Application No. PCT/US2019/041451, International Search Report & Written Opinion, 13 pages, dated Oct. 9, 2019.

*Primary Examiner* — Khoi V Le
(74) *Attorney, Agent, or Firm* — Ortiz & Lopez, PLLC; Luis M. Ortiz; Kermit D. Lopez

(57) ABSTRACT

Systems, methods, and software are disclosed herein to execute functionalities of a blockchain operating system. A transactional request for an operating system instruction is received from a user device in a distributed network of nodes. The transactional request is authenticated in the distributed network of nodes based on data associated with the transactional request. A blockchain is then evaluated for one or more scripts associated with the transactional request. In response, the operating system instruction is generated based on the one or more scripts. The operating system instruction is then transferred to the user device in the distributed network or nodes.

19 Claims, 10 Drawing Sheets

(56) References Cited

U.S. PATENT DOCUMENTS

2019/0188411 A1* 6/2019 Kroutik .................. H04L 63/08
2019/0190896 A1* 6/2019 Singh .................. H04L 63/0435
2019/0207759 A1   7/2019 Chan et al.
2019/0238316 A1* 8/2019 Padmanabhan ........ G06N 20/00

\* cited by examiner

BLOCKCHAIN OPERATING SYSTEM

CROSS-REFERENCE TO RELATED APPLICATIONS

This application is a continuation of U.S. patent application Ser. No. 16/880,239 filed May 21, 2020; which is a continuation of U.S. patent application Ser. No. 16/509,313 filed Jul. 11, 2019 and issued as U.S. Pat. No. 10,708,250 on Jul. 7, 2020; which claims priority to U.S. Provisional Application No. 62/696,561 filed Jul. 11, 2018, the entire contents of each of which are incorporated herein by reference for all purposes.

TECHNICAL FIELD

Various embodiments of the present technology generally relate to multi-ledger systems. More specifically, some embodiments relate to a block chain operating system.

BACKGROUND

Blockchains allow a network of users to make a digital ledger of data and share the data among the other users in the network. Unlike previous database structures, the blockchain database is maintained by a multitude of independent users spread across a large distributed network. When a transaction is recorded into the blockchain database, it is very difficult, if not impossible, to change or remove that data from the database since the data is stored in more than one node in the distributed network. Therefore, data is added into the blockchain database by multiple users and changing the recorded data would require each of these users (or a majority of the users) to agree to the change. This distribution of control to add, edit, and remove data from the blockchain database creates trust amongst users in the network, especially when users are not familiar with one another.

OVERVIEW

An enhanced system, method, and software application are disclosed herein to execute functionalities of a blockchain operating system. A transactional request for an operating system instruction is received from a user device in a distributed network of nodes. The transactional request is authenticated in the distributed network of nodes based on data associated with the transactional request. A blockchain is then evaluated for one or more scripts associated with the transactional request. In response, the operating system instruction is generated based on the one or more scripts. The operating system instruction is then transferred to the user device in the distributed network or nodes.

Embodiments of the present technology also include computer-readable storage media containing sets of instructions that when executed by one or more processors cause one or more machines to perform the methods, variations of the methods, and other operations described herein.

Some embodiments can receive a transactional request from an application developer device comprising one or more operating system processes to be executed when a set of conditions associated with the one or more operating system processes are met. Smart contract block entries including the one or more operating system processes can be generated and stored in a blockchain shared by a distributed network of nodes. A transactional request can be received for one or more hardware operation instructions from an application user device including a set of conditions and authentication data. The transactional request can be authenticated based on a consensus of validity of the authentication data associated with the transactional request by the nodes in the distributed network of nodes. One of the smart contract block entries in the blockchain can include the operating system processes corresponding to the one or more hardware operation instructions. A determination can be made that the set of conditions associated with the one or more operating system processes are met by the set on conditions included in the transactional request. The operating system processes of the one of the smart contract block entries in the blockchain can be executed in the distributed network of nodes. The one or more hardware operation instructions can be generated based on the executed operating system processes and transferred to the application user device in the distributed network or nodes.

Some embodiments provide for a system that includes a shared data layer, a shared protocol layer, a decentralized application platform, and a decentralized operating system. In accordance with various embodiments, the shared data layer configured to store validated transactions in a blockchain. The validated transactions can include a plurality of block entries including executable instructions and associated validation data. The shared protocol layer, in some embodiments, can be connected to the shared data layer and configured to: 1) receive a transactional request for an executable instruction stored in one of the plurality of block entries in the blockchain on the shared data layer, wherein the transactional request includes a key-pair code; 2) validate the transactional request for the executable instruction based on the key-pair code and the associated validation data of the block entry; and 3) execute the executable instruction associated of the block entry and generate shared protocols which are used to build a plurality of Decentralized Applications (DApps) and a plurality of decentralized Operating Systems (OSs). The decentralized application platform may be connected to the shared protocol layer configured to host the plurality of DApps and generate DApp Application Programming Interfaces (APIs). The decentralized operating system platform connected to the shared protocol layer and the decentralized application platform and configured to: 1) host the plurality of decentralized OSs; 2) generate OS APIs for the plurality of DApps hosted on the decentralized application platform; and 3) transfer the OS APIs to a user device in response to the previously received transactional request.

In some embodiments, a transactional request can be received for one or more hardware operation instructions from an application device including a set of conditions and authentication data. The transactional request can be authenticated based on a consensus of validity of the authentication data associated with the transactional request by nodes in a distributed network of nodes. A smart contract block entry or an entry with executable code can be identified in a blockchain comprising operating system processes corresponding to the one or more hardware operation instructions. A determination can be made as to whether a set of conditions associated with the operating system processes are met by the set on conditions included in the transactional request. The operating system processes in the blockchain can then be executed in the distributed network of nodes and the one or more hardware operation instructions can be generated based on the executed operating system processes. The one or more hardware operation instructions can be transferred to the application device in the distributed network or nodes.

In some embodiments, transactional request can be received from an application developer device comprising one or more operating system processes to be executed when a set of conditions associated with the one or more operating system processes are met. An entry or smart contract block entry can be generated including the one or more operating system processes. A transactional request for one or more hardware operation instructions can be received (e.g., from an application user device). In some embodiments, the transactional request can include a set of conditions and authentication data. The transactional request can be authenticated (e.g., based on a consensus of validity of the authentication data associated with the transactional request by the nodes in the distributed network of nodes).

One of the block entries in the blockchain containing the one or more operating system processes corresponding to the one or more hardware operation instructions can be identified. A determination can be made as to whether the set of conditions associated with the one or more operating system processes are met by the set on conditions included in the transactional request. The one or more operating system processes of the one of the smart contract block entries in the blockchain can be executed (e.g., in some of the distributed network of nodes) and the one or more hardware operation instructions can be generated based on the executed one or more operating system processes. The one or more hardware operation instructions can then be transferred to the application user device in the distributed network or nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Embodiments of the present technology will be described and explained through the use of the accompanying drawings.

Figure 1:
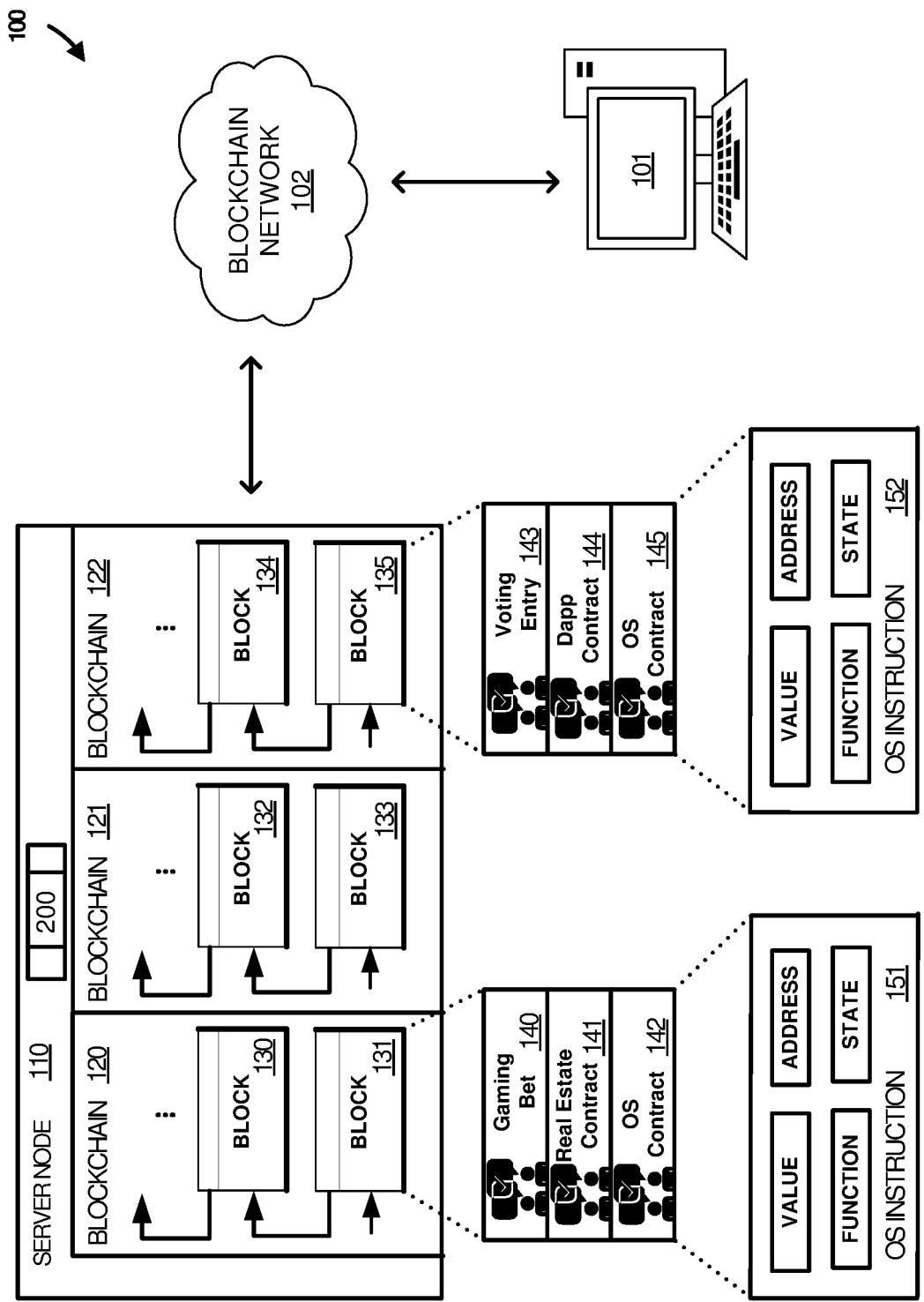
FIG. 1 illustrates an operational architecture for implementing an enhanced blockchain operating system.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

Various embodiments of the present technology generally relate to multi-ledger systems. More specifically, some embodiments relate to a blockchain operating system. Blockchains have become commonplace within multi-ledger systems for storing, managing, and sharing the data among users in a distributed network. Unlike previous database structures, the blockchain database is maintained by a multitude of independent users spread across a large distributed network of nodes. Blockchains an be public, private, or a hybrid.

A public blockchain is a digital ledger that is open to any user to enter and record data (also referred to herein as transactions or block entries) into a block of the blockchain. A private blockchain, which is sometimes referred to as a permissioned blockchain, is a digital ledger which places permissions on which users can access and/or add data to the blockchain. When a transaction is recorded into the blockchain database, it is very difficult, if not impossible, to change or remove the transaction data from the database since the data is stored in more than one node in the distributed network. Therefore, data is added into the blockchain database by multiple users and changing the recorded data by adding, editing, or removing data would require a majority of the users or a master controller supervising changes and a cosigner (e.g., manager and employee, auditor and pit boss, etc.) to agree to the change.

Additionally, each block can include a variety of information including, but not limited to, the data, the hash of the current block, and the hash of the previous block. The blockchain may also store additional details about the transaction in the block, such as the username initiating the transaction, other usernames of parties associated with the transaction, a timestamp, among other information that relates to the transaction. The hash identifies the block and the transaction data stored within the block. The hash is unique from all other hashes and changes whenever a change is made to the block. Since each block contains the hash of the previous block, the blocks form what is known as a blockchain. Any tampering with a block will cause a change in the hash of that block. Therefore, all other blocks in the blockchain will become invalid since they no longer contain a valid hash of the previous block.

While it may be possible to change the hash of each subsequent block in the blockchain, it would be nearly impossible to change each blockchain stored on each node in the distributed network, for both private, hybrid, and public networks. This combination of storing previous hashes to form the blockchain and distributing a full copy of the blockchain to each node in the distributed network creates a system of trust amongst users and the stored transactions in the network, especially when users are not familiar with one another.

One additional component which has emerged from blockchain technology are smart contracts. Smart contracts contain pre-specified rules which may be used to verify and perform transactions between users without a third-party facilitator. Data and instructions used to execute transactions according to the rules of the smart contract may be included in blocks of the blockchain. Since smart contracts contain scripts, programming language may be included in the smart contract functionalities. The scripts comprising the programming language may then be used to encode arbitrary state transition functions and allow developers to create advanced applications in a decentralized computing platform.

Additionally, Decentralized Applications (DApps) may be added to the blockchain network by including chunks of code into smart contracts of the blockchain. These DApps may include payment applications, peer-to-peer gambling applications, financial trading applications, insurance applications, or any other software program. The DApps may also include blockchain applications for maintenance and access to patient records, medical records, and other records and/or transactions which may be interacted with using the blockchain DApp platform. Typically, the operations of the DApps may be stored within the blockchain.

While the infrastructure to offer DApps as an interface between users and the blockchain network has become a commonplace in blockchain networks, these DApps generally require a variety of operating system functions and protocols to execute the DApps. While there are limitless servers and user nodes which may be used to execute the operating system functions and protocols, each server or user node may have a different operating system or version of the operating system, especially when updates to the functions and protocols are not immediately adapted by each server or user node in the blockchain network. Unfortunately, the operations may not be executed consistently by each server or user node, or in some instances, may not be able to be executed at all. Furthermore, developers creating the DApps on the blockchain network do not have a standard operating system in which the programs for the DApps can be built on. Therefore, a need to ensure that each server and user node has a standard and up-to-date operating system is required.

Additionally, large scale applications have historically relied on a highly centralized operating system to manage and standardize the operating system processes required to run applications. For example, cloud-based operating systems and virtual machine operating systems provide functionalities to execute the operating system processes. Although this allows a standardized operating system for users to interface with applications, these centralized operating systems not offer trust amongst users in a network when users are not familiar with one another. Furthermore, these third-party operating systems may be costly to users since the robustness to handle errors and resources required for executing the operating system are constrained by the central operating system. Therefore, a decentralized operating system is required. Since a decentralized operating system may be essentially limitless in the number of nodes which makeup the distributed network for the blockchain, there is an unlimited number of resources which may be used to accurately and efficiently perform the operating system processes.

Examples of the present disclosure describe a system, process, and application for executing functionalities of a blockchain operating system. A transactional request for an operating system instruction can be received from a user device in a distributed network of nodes. The transactional request can be authenticated in the distributed network of nodes based on data associated with the transactional request. A block within the blockchain can then be evaluated for one or more scripts associated with the transactional request. In response, the operating system instruction can be generated based on the one or more scripts. The operating system instruction can then be transferred to the user device in the distributed network or nodes.

An example of a technical effect that may be appreciated from some embodiments is the increased efficiency in executing functionalities of an operating system by allowing operating system instructions to be executed using a multitude of Computer Processing Units (CPUs), memories and storage devices, and controllers and drivers distributed across the nodes of the blockchain network. Essentially, the blockchain operating system using the blockchain platform may be limitless since the execution of operating system instructions are not constrained in resources.

Various embodiments described herein also improve efficiency for developers creating applications which are executed by the blockchain operating system. Operating system protocols which may be difficult for developers to build on top of may be able to more quickly and easily build applications on the blockchain operating system. Additionally, developers may add or enhance features for the applications and the operating systems frequently. Therefore, some embodiments allow a robust enough computing environment to handle updates, recover, and debugging of applications executed by the blockchain operating system. Furthermore, any changes made to the protocols may be approved much quicker. Therefore, changes to the protocols are adopted much faster and the nodes in the distributed network are automatically updated with the new protocols.

An additional technical effect of some embodiments of the present technology which may be appreciated is the ability to parallel process instructions for applications requiring a large amount of resources by dividing the workload amongst the multiple computing nodes in the blockchain network. On the other hand, some implementations described herein may also be beneficial for sequentially process applications which require a large workload. Since the steps of these applications cannot be divided up, each step relies on the previous step for processing. Having unlimited resources allows for a more robust system for executing applications in a decentralized operating system environment and therefore, blocks required for a previously step are produced more quickly allowing the scheduled time for each step in the process to be reduced.

In some embodiments, a transactional request to generate a block of the blockchain comprising the operating system instructions and a set of conditions can be received from another user device in the distributed network of nodes. As such, the transactional request can be authenticated in the distributed network of nodes based on data associated with the transactional request. The operating system instructions can be then stored in the block of the blockchain, wherein the operating system instructions are executed when the set of conditions are met.

In some embodiments, the transactional request for an operating system instruction further comprises an indication of a decentralized application function to be executed using the operating system instruction. In other embodiments, in the one or more scripts associated with the transactional request comprise at least one script associated with the decentralized application function and at least one script associated with the operating system instruction. Further, the operating system instruction may be generated by executing the at least one script associated with the decentralized application function and the at least one script associated with the operating system instruction to generate the operating system instruction.

In some example scenarios, the blockchain for one or more scripts associated with the transactional request can be evaluated by evaluating a smart contract within the blockchain which include the one or more scripts to be executed when the transactional request is authenticated. In other example scenarios, the operating system instruction comprises at least one customized kernel instruction to be executed by an operating system in the user device. In yet another example scenario, the operating system instruction comprises at least one customized Application Programming Interface (API) to be executed by a kernel in the user device.

In some embodiments, the operating system instruction can be generated by one or more nodes of the distributed network of nodes executing the one or more scripts associated with the transactional request to provide an executed operating system instruction to the user device. For example, the operating system instruction may be generated and executed by one or more CPUs in the distributed node network. In other embodiments, the transactional request for the operating system instruction comprises characteristic data associated with the operating system instruction. Further in this example, the operating system instruction can be generated by generating an executed operating system instruction in accordance with the characteristic data associated with the operating system instruction.

In yet another implementation, the transactional request may be received from an application developer device comprising one or more operating system processes to be executed when a set of conditions associated with the one or more operating system processes are met. In a next step, smart contract block entries can be generated including the one or more operating system processes and stored the smart contract block entries in a blockchain shared by a distributed network of nodes. Further in this example, a transactional request for one or more hardware operation instructions is received from an application user device including a set of conditions and authentication data. The transactional request can be then authenticated based on a consensus of the validity of the authentication data associated with the transactional request by the nodes in the distributed network of nodes. In response, one of the smart contract block entries in the blockchain can be identified comprising the operating system processes corresponding to the one or more hardware operation instructions. determining that the set of conditions associated with the one or more operating system processes are met by the set on conditions included in the transactional request. The operating system processes of the one of the smart contract block entries in the blockchain can be then executed in the distributed node network. Further in this example, the one or more hardware operation instructions can be generated based on the executed operating system processes. The one or more hardware operation instructions are then transferred to the application user device in the distributed network or nodes.

In another example scenario, a transactional request can be received for one or more hardware operation instructions from an application user device including a set of conditions and authentication data. The transactional request can be then authenticated based on a consensus of the validity of the authentication data associated with the transactional request by nodes in the distributed network of nodes. Further in this example scenario, a smart contract block entry can be identified in a blockchain comprising operating system processes corresponding to the one or more hardware operation instructions. A set of conditions associated with the operating system processes are determined to be met by the set on conditions included in the transactional request. This example scenario further includes the distributed network of nodes executing the operating system processes of the smart contract block entry in the blockchain. In response, the one or more hardware operation instructions can be generated based on the executed operating system processes and transferred to the application user device in the distributed network or nodes.

In another implementation, a transactional request is received from an application developer device comprising one or more operating system processes to be executed when a set of conditions associated with the one or more operating system processes are met. Smart contract block entries including the one or more operating system processes can be generated and stored in a blockchain shared by a distributed network of nodes. The transactional request for one or more hardware operation instructions can be then received from an application user device including a set of conditions and authentication data. The implementation further includes authenticating the transactional request based on a consensus of the validity of the authentication data associated with the transactional request by the nodes in the distributed network of nodes.

In response, one of the smart contract block entries in the blockchain comprising the one or more operating system processes corresponding to the one or more hardware operation instructions can be identified. The set of conditions associated with the one or more operating system processes can be then determined to be met by the set on conditions included in the transactional request. Executing, in the distributed network of nodes, the one or more operating system processes of the one of the smart contract block entries in the blockchain. The one or more hardware operation instructions can be then generated based on the executed one or more operating system processes and transferred to the application user device in the distributed network or nodes.

In yet another embodiment, a shared data layer is configured to store validated transactions in a blockchain. The validated transactions comprise a plurality of block entries including executable instructions and associated validation data. The implementation can also include a shared protocol layer connected to the shared data layer configured to receive a transactional request for an executable instruction stored in one of the plurality of block entries in the blockchain on the shared data layer. The transactional request can include, for example, a key-pair code. The shared protocol layer can also validate the transactional request for the executable instruction based on the key-pair code and the associated validation data of the block entry and executes the executable instruction associated of the block entry to generate shared protocols. The shared protocols can be then used to build a plurality of decentralized applications and decentralized operating systems. Further in this implementation, a decentralized application platform can be connected to the shared protocol layer which is configured to host the decentralized applications which are developed and operated using the shared protocols. Finally, a decentralized operating system platform can be connected to the shared protocol layer and the decentralized application platform which is configured to execute functionalities of the decentralized applications hosted on the decentralized application platform.

In some example scenarios, the shared protocol layer can be configured to generate the shared protocols which are used to build a plurality of Decentralized Applications (DApps) and a plurality of decentralized Operating Systems (OSs). The decentralized application platform connected to the shared protocol layer is then configured to host the plurality of DApps and generate DApp Application Programming Interfaces (APIs). Further in this example, the decentralized operating system platform can be configured to host the plurality of decentralized OSs, generate OS APIs for the plurality of DApps hosted on the decentralized application platform, and transfer the OS APIs to a user device in response to the previously received transactional request.

While the present disclosure describes various embodiments, it should be appreciated that additional examples may be included for technical improvement in additional industries. Example operating system instructions may include authentication, scheduling of resources, communications, account management, and the like.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," "in some scenarios," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

Figure 10:
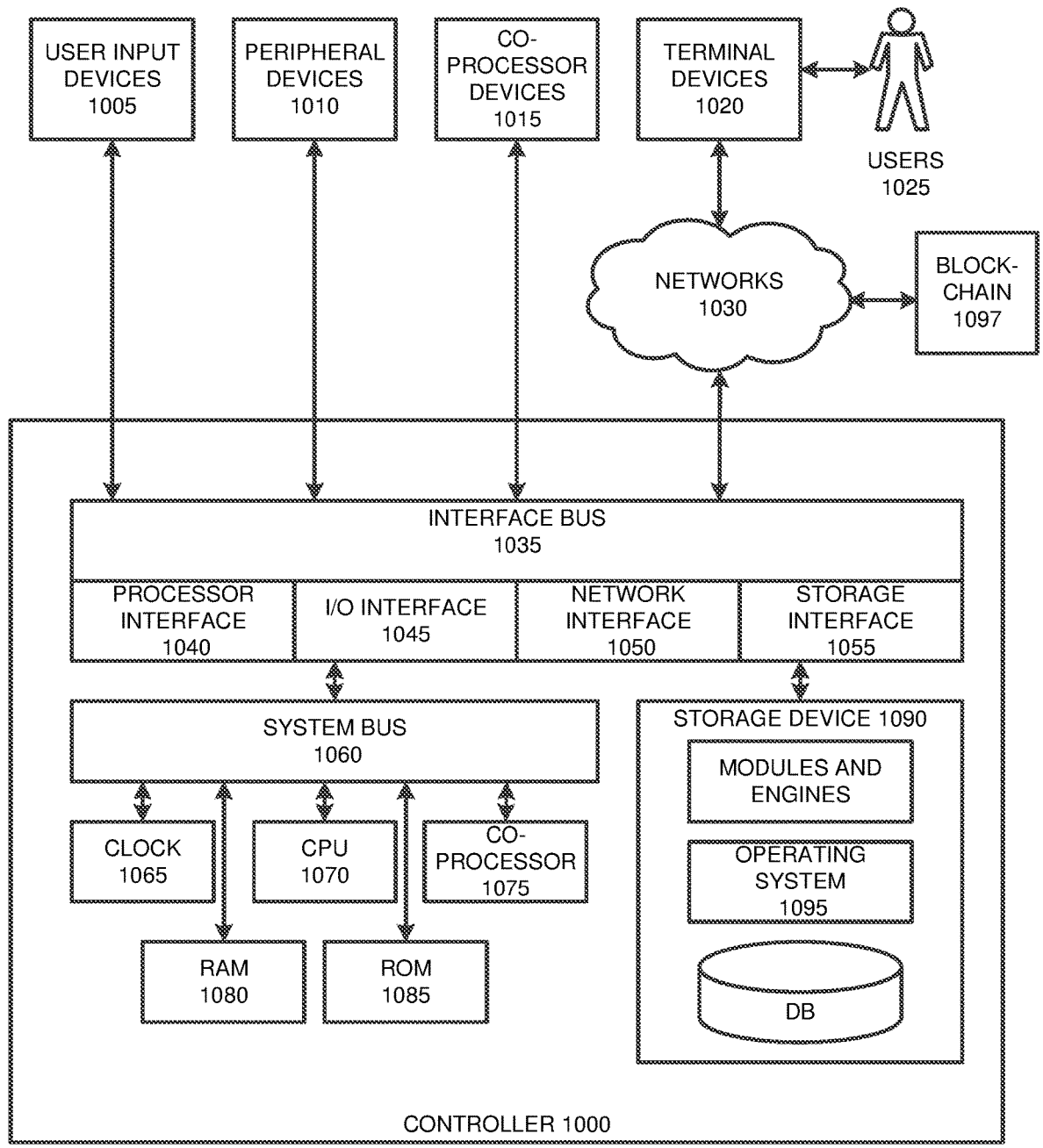
FIG. 10 illustrates a computing system suitable for implementing the technology disclosed herein, including any of the architectures, processes, operational scenarios, and operational sequences illustrated in the Figures and discussed below in the Technical Description.

Referring to the drawings, FIG. 1 illustrates an example of an operational architecture 100 related to processing operations for management of an exemplary enhanced system with which aspects of the present disclosure may be practiced. As illustrated in the embodiments shown in FIG. 1, operational architecture 100 can include user device 101 and blockchain network 102. Blockchain network 102 can includes one or more server nodes 110 which employ a blockchain operating system process 200 in the context of storing, retrieving, and executing operating system instructions. Blockchain network 102 may include various hardware and software elements in a supporting architecture suitable for performing blockchain operating system process 200. One such representative architecture is illustrated in FIG. 10 with respect to controller 1000.

Server node 110 can include one or more servers and devices capable of running a blockchain application. User devices 101 interacting with server node 110 may include, but are not limited to, personal computers, mobile phones, handheld device, tablet computers, desktop computers, laptop computers, wearable computing devices, dedicated specialized devices (e.g., gaming machines, set top boxes, etc.) or any other form factor, including any combination of computers or variations thereof. Blockchains 120-122 represent digital ledgers that are open for a user to enter and record data into blocks 130-135 of blockchains 120-122. Blockchains 120-122 may be added by multiple users and recorded by multiple server nodes, such as server node 110 in the distributed network.

As illustrated in FIG. 1, blocks 130-135 include block entries 140-146. Block entries 140-146 may include gaming bets, inventory records, medical records, employment records, banking and financial records, real estate or title contract, DApps code stored as a smart contract, OS code stored as a smart contract, and any other type of block entry of smart contract combination or variation thereof. For instance, the user may create block entry 140 by entering into a gaming bet with another user and then storing the contract as block entry 140 in blockchain 120 on server node 110 in the distributed network environment.

Block entries 140-145 can also each include data portions, such as OS instructions 151-152. In some embodiments, OS instructions 151-152 can comprise the components which make up each of block entries 142 and 145 and may be broken into code segments based on a transaction request authorization and a set of conditions which must be met to access and/or execute the OS instructions. For example, OS instructions 151-152 may each include a value, function, address, and state.

Figure 2:
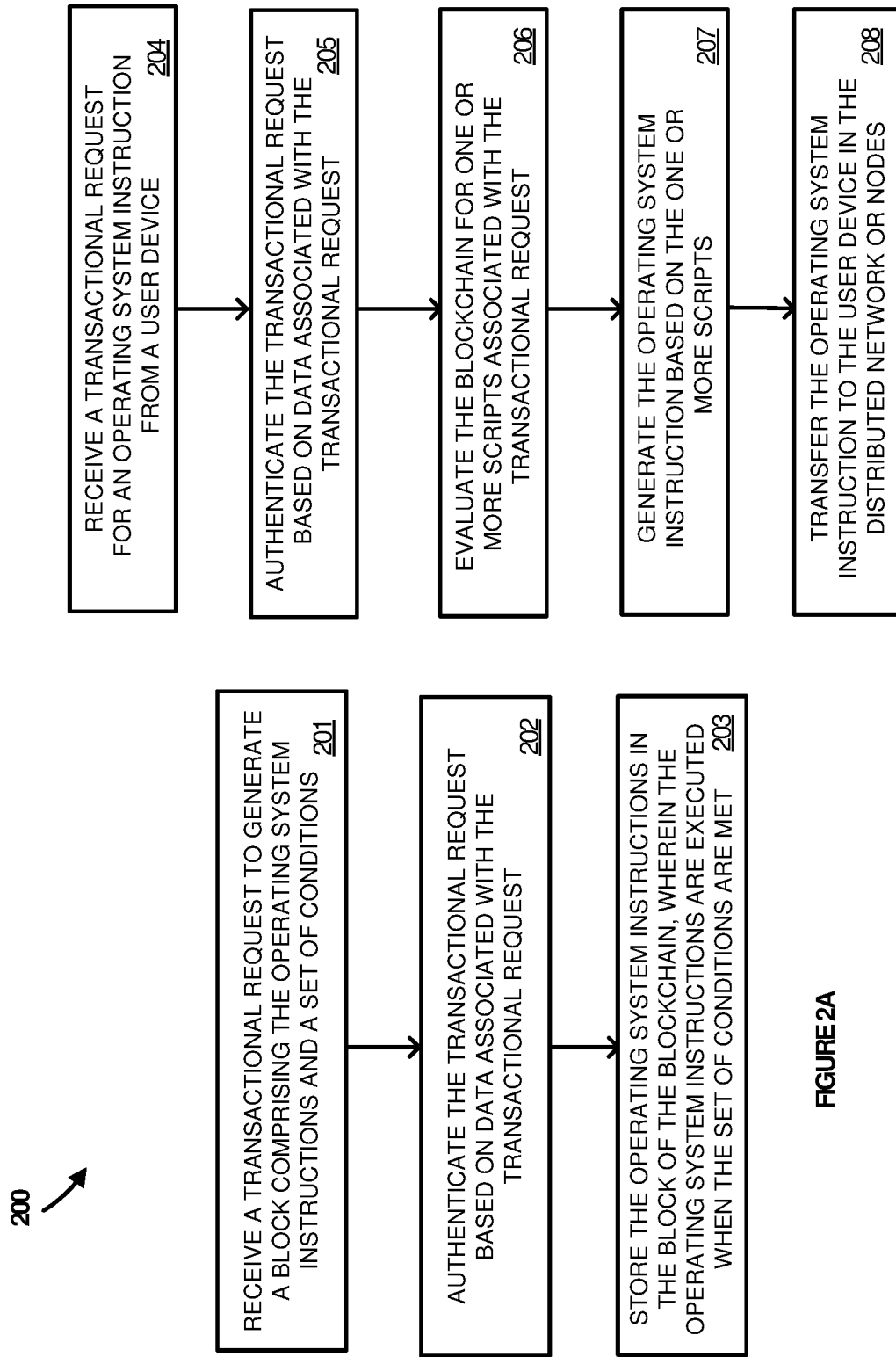
FIGS. 2A-2B illustrate examples of blockchain operating system processes employed in various implementations of an enhanced blockchain operating system.

More particularly, FIGS. 2A-2B illustrates examples of a blockchain operating system process 200 which, as mentioned, may be employed by some embodiments of blockchain network 102 to store and execute operating system functionalities in a blockchain as described herein. Some or all of the steps of blockchain operating system process 200 may be implemented in program instructions in the context of a component or components of the application used to carry out the blockchain operating system feature. The program instructions direct blockchain network 102 to operate as follows, referring parenthetically to the steps in FIG. 2A in the context of FIG. 1.

In operation, blockchain network 102 can receive a transactional request to generate a block of the blockchain comprising operating system instructions and a set of conditions (step 201). The transactional request may be received from a developer user device and include operating system code which may be used to execute various operating system functionalities. In some embodiments, the operating system instructions may include scripts to authenticate access to a user account. In other embodiments, the operating system instructions may include scripts to schedule resources for functionalities required to execute an application. In yet another embodiment, the operating system instructions may include scripts used to perform communications with other user accounts interacting with blockchain network 102.

For example, operating system instructions may include scripts required to authenticate a user interacting with a voting DApp. The operating system instructions may further be used to communicate messages between various different DApps which may not share common protocols, but which interact with blockchain network 102. In some embodiments, the operating system instructions may include scripts which may be executed by one or more nodes in blockchain network 102, such as server node 110. However, in other embodiments, the operating system instructions may be used to generate a modified form of the operating system instructions, such as APIs, pointers, cryptography, proof of work, customized kernel instructions, etc.

In a next operation, blockchain network 102 can authenticate the transactional request in the distributed network of nodes based on data associated with the transactional request (step 202). The transactional request may be generated using a key-pay or encrypted code verifying the identity and authorized privileges of the user transferring the transactional request. Next, blockchain network 102 can store the operating system instructions in the block of the blockchain (step 203). The operating system instructions can be executed when the set of conditions are met. A blockchain database may be maintained by a multitude of independent users spread across blockchain network 102 of server node 110. In this example scenario, the operating system instructions can be stored in block entry 142 of block 131. The set of instructions may include terms of the smart contract which would need to be met in order to produce and/or execute the operating system instructions. For example, the operating system instructions may only be executed when a user is authorized and when an instruction from a DApp is received.

Referring next parenthetically to the steps in FIG. 2B in the context of FIG. 1. In operation, blockchain network 102 may receive a transactional request for an operating system instruction from user device 101 (step 204). User device 101 may be a user interacting with a DApp included on the blockchain platform and created by a developer. Blockchain network 102 may receive the transactional request for an operating system instruction directly, such as a kernel requesting an API from blockchain network 102. However, blockchain network 102 may also receive the transactional request for the operating system instructions in response to receiving a transactional request for blockchain network 102 to execute instructions for a DApp for a user. For example, a user interacting with a DApp may transfer a transactional request to authenticate the user account. However, the block entry comprising the smart contract of DApp instructions may require blockchain network 102 to also execute operating system instructions stored in another block entry comprising the operating system instructions required to then execute the DApp instructions.

In a next operation, blockchain network 102 can authenticate the transactional request in the distributed network of nodes based on data associated with the transactional request (step 205). Similar to when the operating system instructions were entered into a block entry in a blockchain of blockchain network 102, the transactional request to later retrieve and/or execute the operating system instructions may also require that the transactional request be authenticated from user device 101. In some embodiments, the authentication of the transactional request for the operating system instructions may generate an additional block entry in a block of the blockchain. However, in other embodiments, the authentication of the transactional request may include an access code and/or conditions which allow the user to access the operating system instructions for later use.

In a next operation, blockchain network 102 can evaluate the blockchain for one or more scripts associated with the transactional request (step 206). The one or more scripts may include scripts to execute various functionalities for a DApp. For example, the one or more scripts may include code which when executed may schedule resources for the DApp application or authenticate the user account for the DApp. In other example scenarios, the one or more scripts may include code which when executed may enable one DApp to transfer and receive communications with another DApp, coordinate user account profile information and authentication data, and other functionalities which may be executed on blockchain network 102 using shared protocols.

Still referring to FIG. 2B, blockchain network 102 can generate the operating system instruction based on the one or more scripts (step 207). In some example scenarios, the operating system instructions can include APIs which may be used to execute functionalities of a DApp or other operating system process. However, in other example scenarios, the operating system instructions may comprise customized kernel instructions. For example, the customized kernel instructions may enable a kernel to be compatible with various protocols used by the DApps in blockchain network 102. In other embodiments, the customized kernel instructions may be generated by blockchain network 102 to a less resource intensive format. This may be accomplished by one or more server nodes of blockchain network 102 executing the one or more scripts to generate the customized kernel instructions.

In a final operation, block chain network 102 can transfer the operating system instruction to the user device in the distributed network or nodes (step 208). The operating system instruction may be sent to user device 101 transferring directly. However, in other example scenarios, the operating system instructions may be executed by one or more server nodes in blockchain network 102 and then used to execute additional instructions for a DApps requiring the operating system instructions to perform the DApp functionalities. It should be noted that various CPUs, memories, databases, and drivers may be used from various servers and devices included in blockchain network 102 to execute the operating system instructions from the block entries in blockchain network 102.

Figure 3:
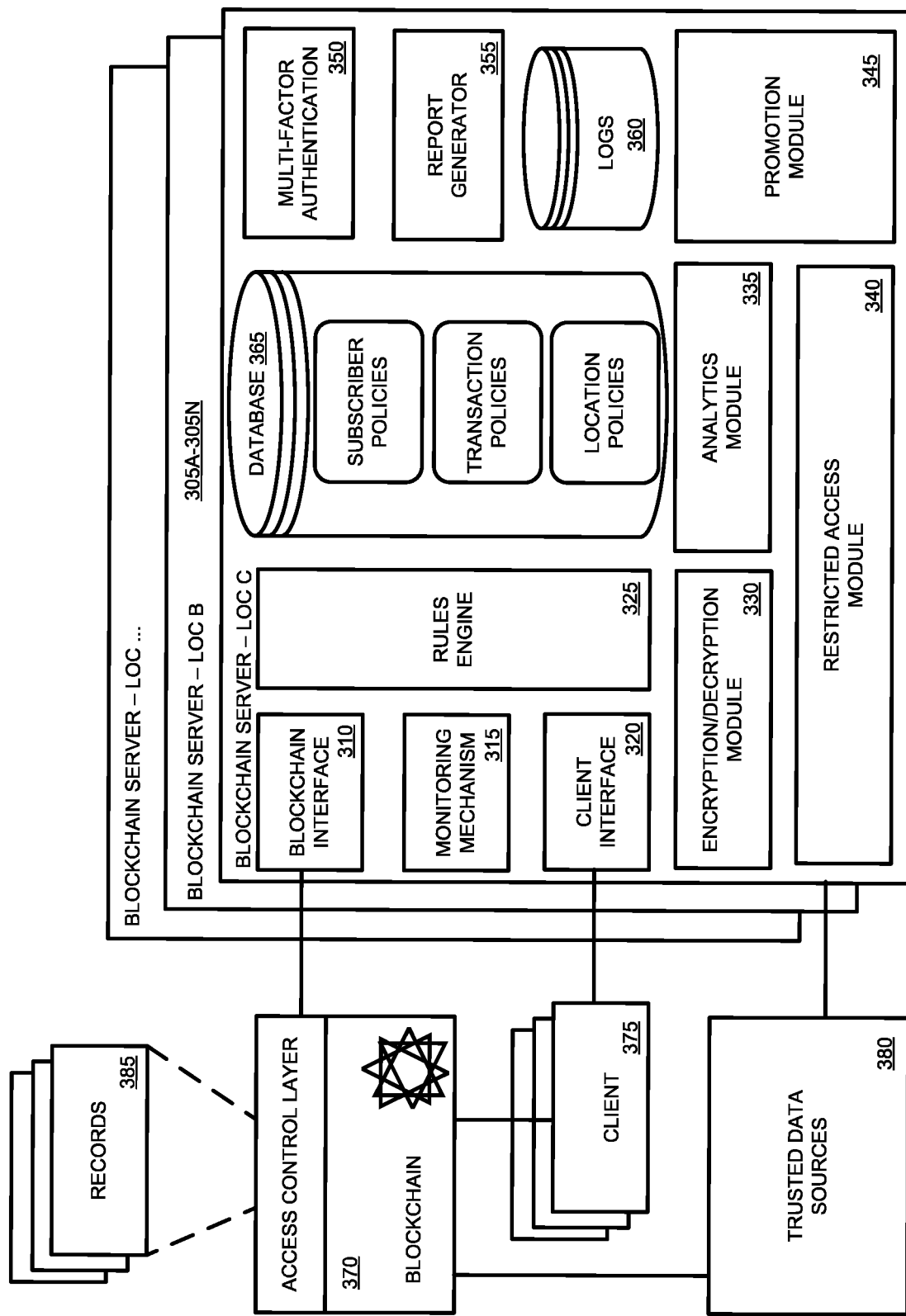
FIG. 3 illustrates an alternative operational architecture for implementing an enhanced blockchain operating system.

FIG. 3 illustrates various components of a blockchain data platform utilizing a blockchain operating system according to various embodiments of the present technology. As illustrated in FIG. 3, the blockchain data platform may use one or more servers 305A-305N. Each server can include blockchain interface 310, monitoring mechanism 315, client interface 320, rules engine 325, encryption/decryption module 330, analytics module 335, restricted access module 340, promotion module 345, multifactor authentication module 350, report generator 355, and/or databases 360 and/or 365 for storing logs, subscriber policies, transaction policies, location policies, and/or the like. In addition, blockchain servers 305A-305N can connect with blockchain 370 via an access control layer, clients 375, trusted data sources 380, and/or records 385.

Each of these modules, components, or databases can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, databases, and/or components. Still yet, some embodiments may incorporate two or more of these modules and components into a single module and/or associate a portion of the functionality of one or more of these modules with a different module. For example, in one embodiment, rules engine 325 and restricted access module 340 can be combined into a single module for identifying and enforcing various rules and event policies on a user terminal.

Clients 375 may connect to one of blockchain servers 305A-305N using client interface 320. Clients 375 may be able to download (or have preinstalled) firmware or software from blockchain servers 305A-305N that allows clients 375 to enter and view block entries. The block entries may comprise a variety of scripts stored in smart contracts (e.g., operating system scripts, DApps scripts, etc.). In some embodiments, blockchain servers 305A-305N process an encryption code to authenticate a transaction request to access and/or execute operating system instructions generated from the block entries.

In some embodiments blockchain servers 305A-305N may maintain a pointer for each of the plurality of scripts in the block entries indicating at least one published location for each of the plurality of scripts in the block entries. The operating system instructions (such as customized kernel instructions) of the block entry may then be generated by retrieving one or more scripts associated with the transaction request indicating the operating system instruction using the pointer for each of the scripts in the block entries.

In other embodiments, blockchain servers 305A-305N may maintain a separate block entry for each of the scripts associated with each of the operating system instructions. Blockchain servers 305A-305N may evaluate the authorization data and conditions which need to be met based on the data included in the transactional request for the block entries of blockchain 370. In some scenarios, blockchain servers 305A-305N may maintain a separate blockchain for the scripts associated with each of the decentralized applications which may use the operating system instructions to execute. Blockchain servers 305A-305N may then execute the scripts associated with the decentralized applications using the scripts of the operating system instructions executing on blockchain servers 305A-305N.

In some examples, information stored in blockchain 370 may be encrypted using encryption/decryption module 330. In some embodiments, encryption/decryption module 330 may use various non-homomorphic encryption and/or homomorphic encryption. While the non-homomorphic encryption may provide stronger security properties, the use of homomorphic encryption would allow computation on encoded data without decryption. As a result, various components of the system can interact and operate on portions of the data without exposure of sensitive data. Other kinds of encryption may also include double wrapped or re-encryption of the same message. This may further include cascade encryption, cascade ciphering, multiple encryption, super encipherment, or any other encryption method including variations and combinations thereof.

The encryption may also include chaos synchronization where keys may be constantly changed in the blockchain network. Using chaos synchronization, an encryption key may be generated by two distant complex nonlinear units, forced into synchronization by a chaotic driver. When implemented on the blockchain network, chaos synchronization allows the key management system in the neural network to thwart possible key attacks by consistently reconstructing the keys. For example, the keys may be constantly changing at a millisecond level for millisecond encryption.

Monitoring mechanism 315 can monitor transactions and user activities. This can include receiving information from external sources such as, but not limited to, clients 375, video surveillance systems, loyalty card systems, key engines, biometric sensors, and other external systems. In some embodiments, multifactor authentication may be used before allowing a user to enter or to access a monetary transaction, medical record, gaming bet, inventory activity log, and the like. For example, when a patient accesses a medical record, multifactor authentication module 350 may be used to require various types of authentications (e.g., personal pin, biometric, token, etc.).

Rules engine 325 can superimpose rules on the transaction interfaces being presented on clients 375. These rules can be based various policies (e.g., subscriber policies, transaction policies, location policies, etc.) stored in database 365. Analytics module 335 can generate various analytics about layers, clients, games, medical diagnosis, payrolls, package deliveries, Global Positioning System (GPS) locations, payouts, accounts, and/or other system components or activity. This information can be used by report generator 355 to create customized view of the transactions.

Restricted access module 340 can be used to create customized access requirements for different scripts, software, or applications stored in each the block entries and for different users/user types. The records may be stored within blockchain 370 in records 385. The access requirements may be generated by a user entering the transaction, determined based on previously designated user preferences, or by policies required by other party. Databases 360 and/or 365 can be used for storing logs, subscriber policies, transaction policies, location policies, and/or the like. These may be local stores of data retrieved from records 385 associated with blockchain 370. In addition, servers 305A-305N and blockchain 370 can connect with trusted data sources 380 for validation of external events (e.g., outcome of sporting events, reconciliation of vender/buyer journal entries, etc.) that are needed to determine data stored within records 385.

Figure 4:
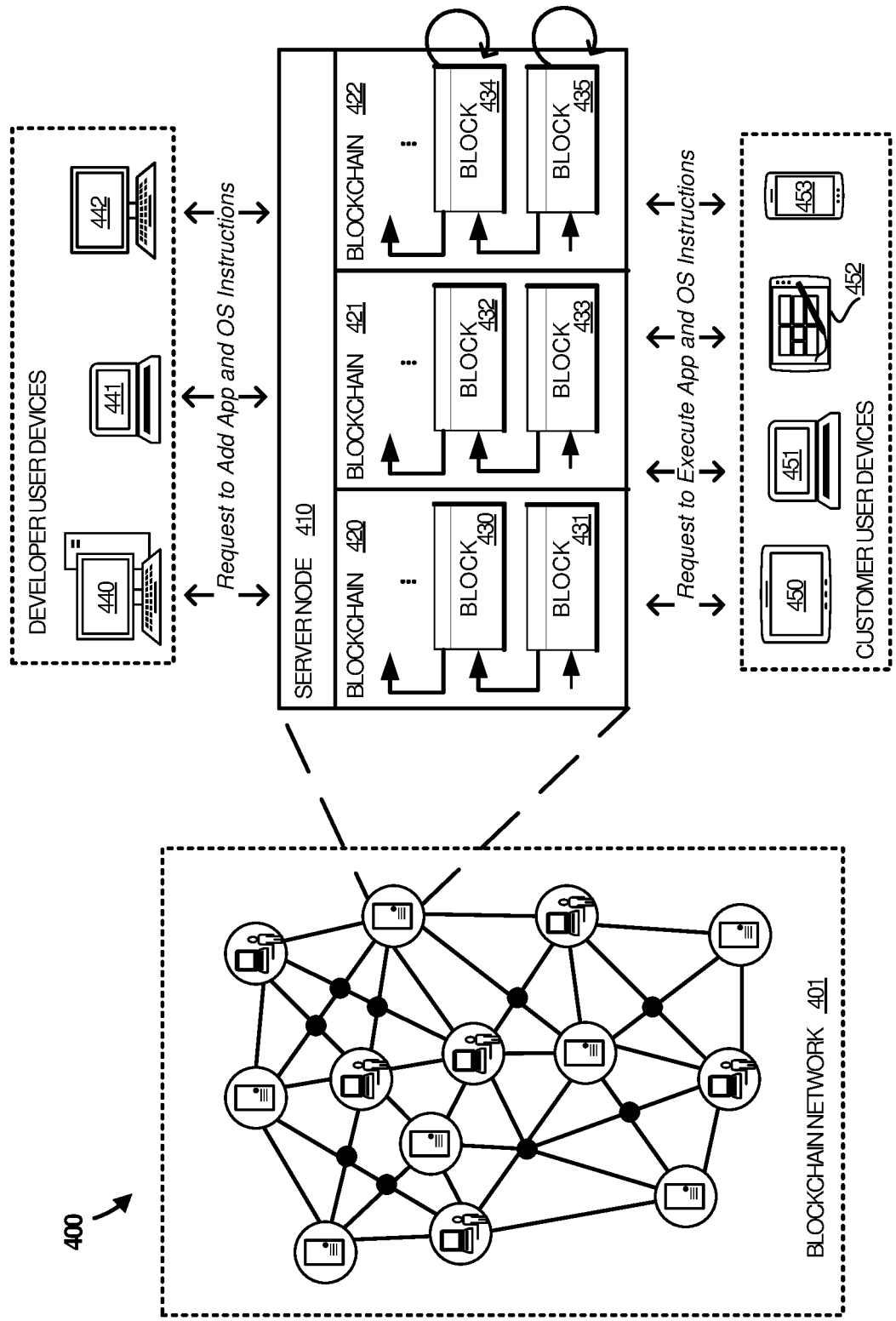
FIG. 4 illustrates an alternative operational architecture for implementing enhanced blockchain operating system to execute decentralized applications.

FIG. 4 illustrates an operating system in accordance with some embodiments of an enhanced application to execute decentralized applications using a blockchain operating system. Block diagram 400 includes blockchain network 401, developer user devices 440-442, and customer user devise 450-453. As seen in FIG. 4, blockchain network 401 includes a network of server nodes and user device nodes. For example, server node 410 is included in the distributed network of nodes and includes a copy of blockchains 420-422. Server node 410 may process transaction requests to include application code instructions from developer user devices 440-442 and OS code instructions to customer user devices 450-453. However, any other node or multiple nodes in blockchain network 401 may be used to authenticate, store, execute, or otherwise process code instructions included transaction requests.

Server node 410 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes.

Block diagram 400 further includes blockchains 420-422 in server node 410. Blockchains 420-422 are contain a continuously growing list of records, called blocks, which are linked and secured using cryptography. Each of the block in blockchains 420-422 contains a timestamp and a hash. The hash includes both a cryptographic hash of the current block and a cryptographic hash of the previous block in the blockchain. Each block also contains data associated with a block entry. In this example scenario, operating system instructions and/or application instructions have been recorded into a block in blockchains 420-422, such as blocks 430-435.

Each of blocks 430-435 may comprise a block entry which includes various scripts which may be retrieved and executed by one or more nodes in blockchain network 401 or transferred to user devices for execution. The transaction request may include any data that will be permanently recorded into the blockchain. The transaction request is subsequently processed by miners and added to a block at the end of the blockchain by a data platform (not shown here). It should be noted that while each of the operating system instructions and the application instructions are represented separately within each of blocks 430-435, portions of the operating system instructions and the application instructions may be included in the same block.

Figure 5:
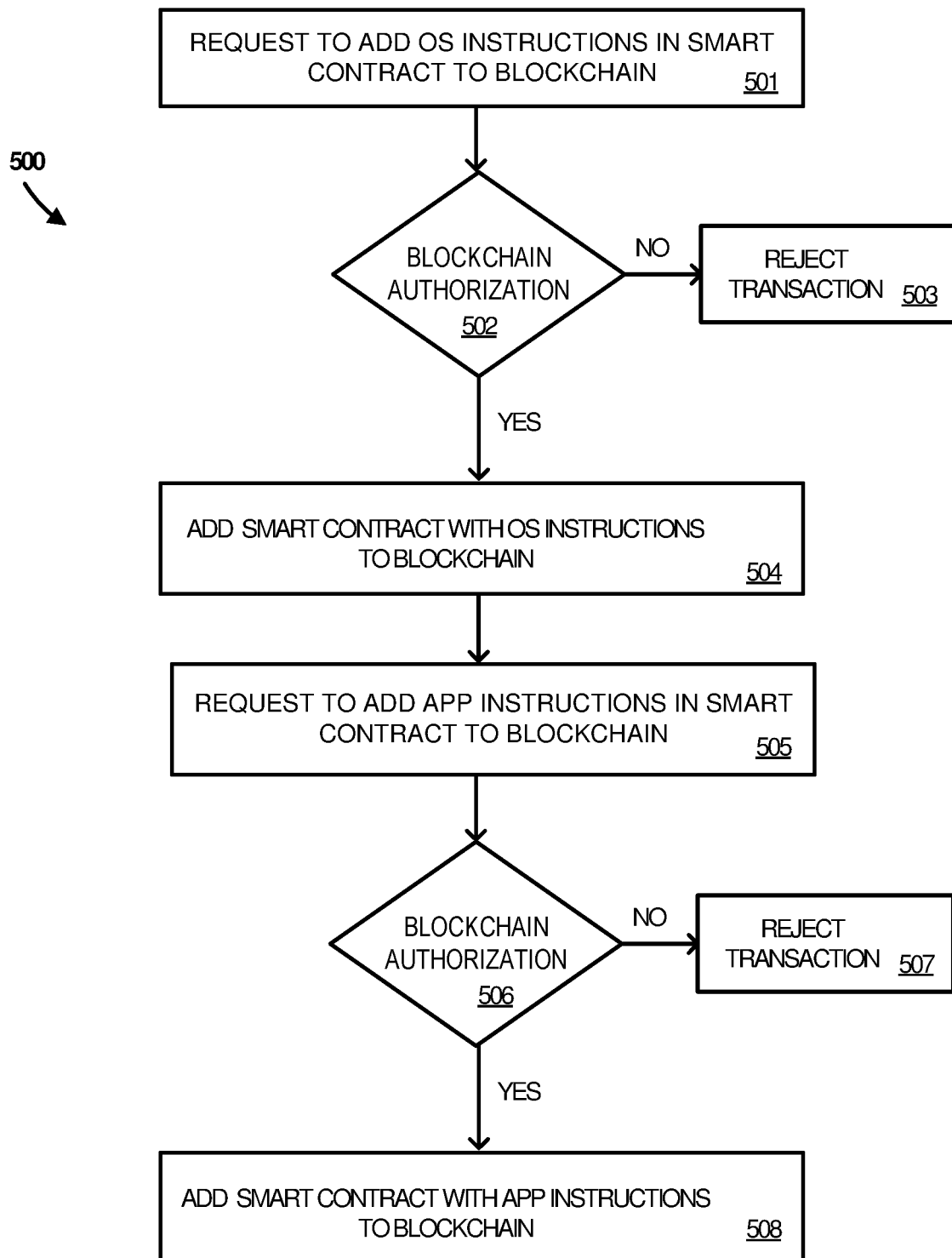
FIG. 5 illustrates a flow diagram in an implementation of an enhanced blockchain operating system to execute decentralized applications.

FIG. 5 illustrates flow diagram showing an example of a set of operations that may be used in an implementation of an enhanced application to execute decentralized applications using a blockchain operating system. In a first operation, blockchain network 401 receives a transaction request from developer user devices to add operating system instructions included in a smart contract to blockchain 422 (step 501). In a next operation, blockchain network 401 determines whether the transaction request is authorized (step 502). If the transaction request is not authorized, the transaction request is rejected (step 503). If blockchain network 401 authorizes the transaction request, the operating system instructions are added to blockchain 422 in a smart contract which may be executed if a set of conditions are met (step 504).

In a next operation, blockchain network 401 receives a transaction request from developer user devices to add decentralized application instructions included in a smart contract to blockchain 422 (step 505). Blockchain network 401 then determines whether the transaction request is authorized (step 506). Once again, if the transaction request is not authorized, the transaction request is rejected (step 507). If blockchain network 401 authorizes the transaction request, the decentralized application instructions are added to blockchain 422 in a smart contract which may be executed if a set of conditions are met (step 508).

Figure 6:
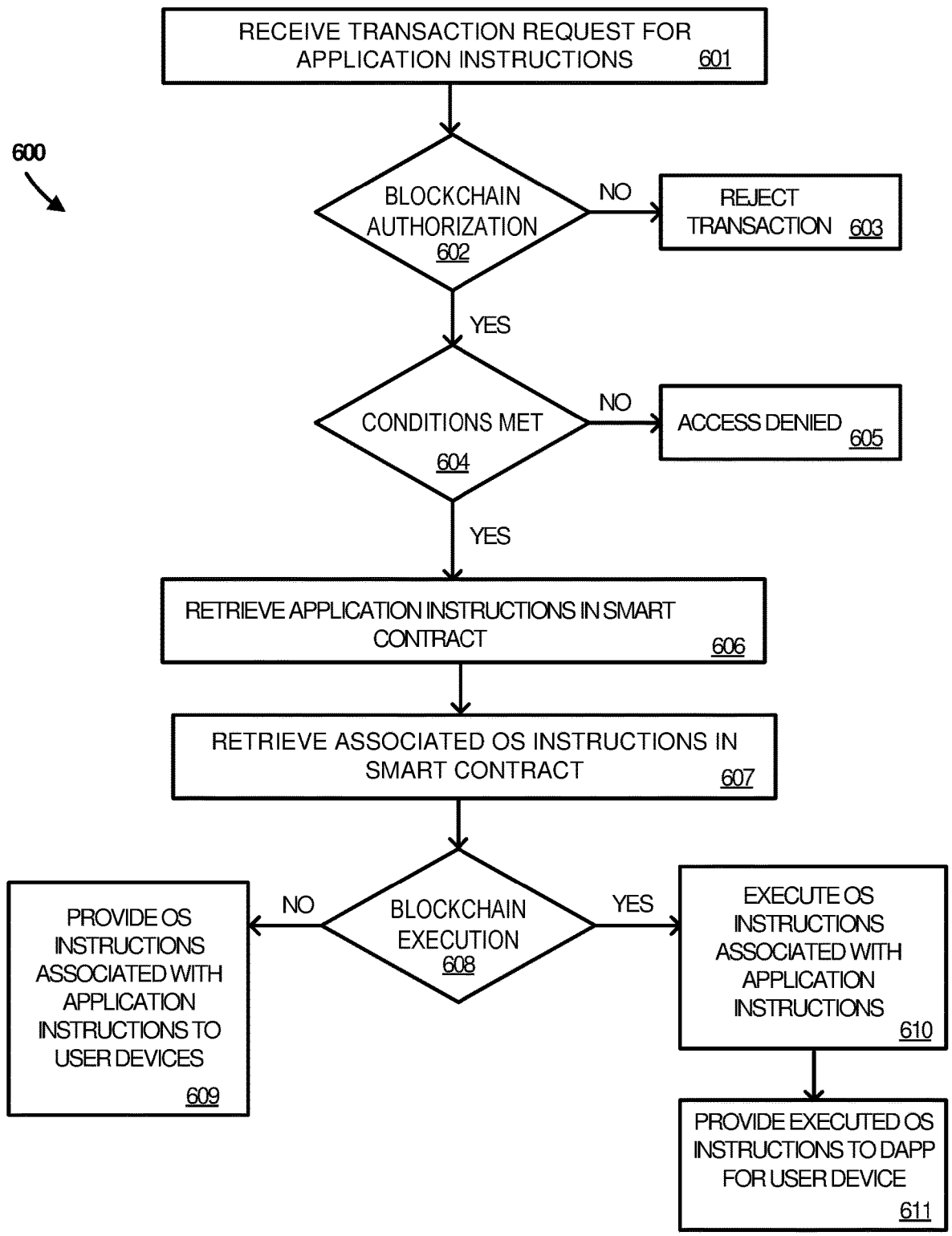
FIG. 6 illustrates a flow diagram in an implementation of an enhanced blockchain operating system to execute decentralized applications.

FIG. 6 illustrates flow diagram in an implementation of an enhanced application to execute decentralized applications using a blockchain operating system. In operation, blockchain network 401 receives a transaction request for application instructions (step 601). The transaction request may be received directly from customer user devices 450-453. However, the transaction request may be received by a decentralized application running on blockchain network 401. In a next step, blockchain network 401 determines whether the transaction request is authorized for the user of the decentralized application (step 602). If the transaction request is determined to be unauthorized, the transaction request is rejected (step 603).

On the other hand, if the transaction request is determined to be authorized, blockchain network 401 then determines whether the set of conditions required to access the contents of the smart contract (as indicated in the received transaction request) are met (step 604). If blockchain network 401 determine that the set of conditions required to access the smart contract which includes the application instructions are not met, access to the application instructions stored in the smart contract of blockchain 422 is denied (step 605). However, if the set of conditions is met (as determined based on the associated data included in the transaction request and the user), then the application instructions stored in the smart contract are retrieved (step 606).

In a next operation, blockchain network 401 retrieves the operating system instructions required to execute the application instructions (step 607). The operating system instructions may be stored in another smart contract in blockchain network 401. At this point in the process, blockchain network 401 determines whether one or more server nodes in blockchain network 401 is required to execute the operating system instructions (step 608). The determination of whether to execute the operating system instructions in blockchain network 401 may be based on indications in the transactional request, an indication in the smart contract, determined capabilities of customer user devices 450-453, capacity and resource measurements available for each of the various nodes in blockchain network 401, etc.

If blockchain network 401 determines that the operating system instructions are not to be executed by blockchain network 401, blockchain network 401 transfers the operating system instructions required to execute the application instructions to the customer user device (step 609). The operating system instruction may be a modified version of the operating system instructions. For example, the operating system instructions provided to the customer user device may include a customized kernel instruction. In other examples, the operating system instruction may include a set of operating system APIs and/or a set of decentralized application APIs. However, the operating system instructions may further include pointers to databases and libraries.

If blockchain network 401 determines that the operating system instruction should be executed by blockchain network 401, blockchain network 401 executes the operating system instruction associated with the application instructions (step 610). Blockchain network 401 may execute the operating system instructions on one server node in the distributed network of server nodes, such as server node 410. For example, server node 410 may execute all operating system instructions requiring sequential processing. Blockchain network 401 may also execute the operating system instructions on a number of server nodes in a cloud-based network node environment. For example, various portions of the operating system instructions may be processed in parallel by multiple server nodes in blockchain network 401. Additionally, blockchain network 401 may process only a portion of the operating system instructions and then provide the user device interacting with blockchain network 401 (such as over a decentralized application) with another portion of the operating system instructions or a modified version of the operating system instructions. In a final operation, blockchain network 401 provides the executed operating system instructions to the decentralized application for the user device (step 611).

Figure 7:
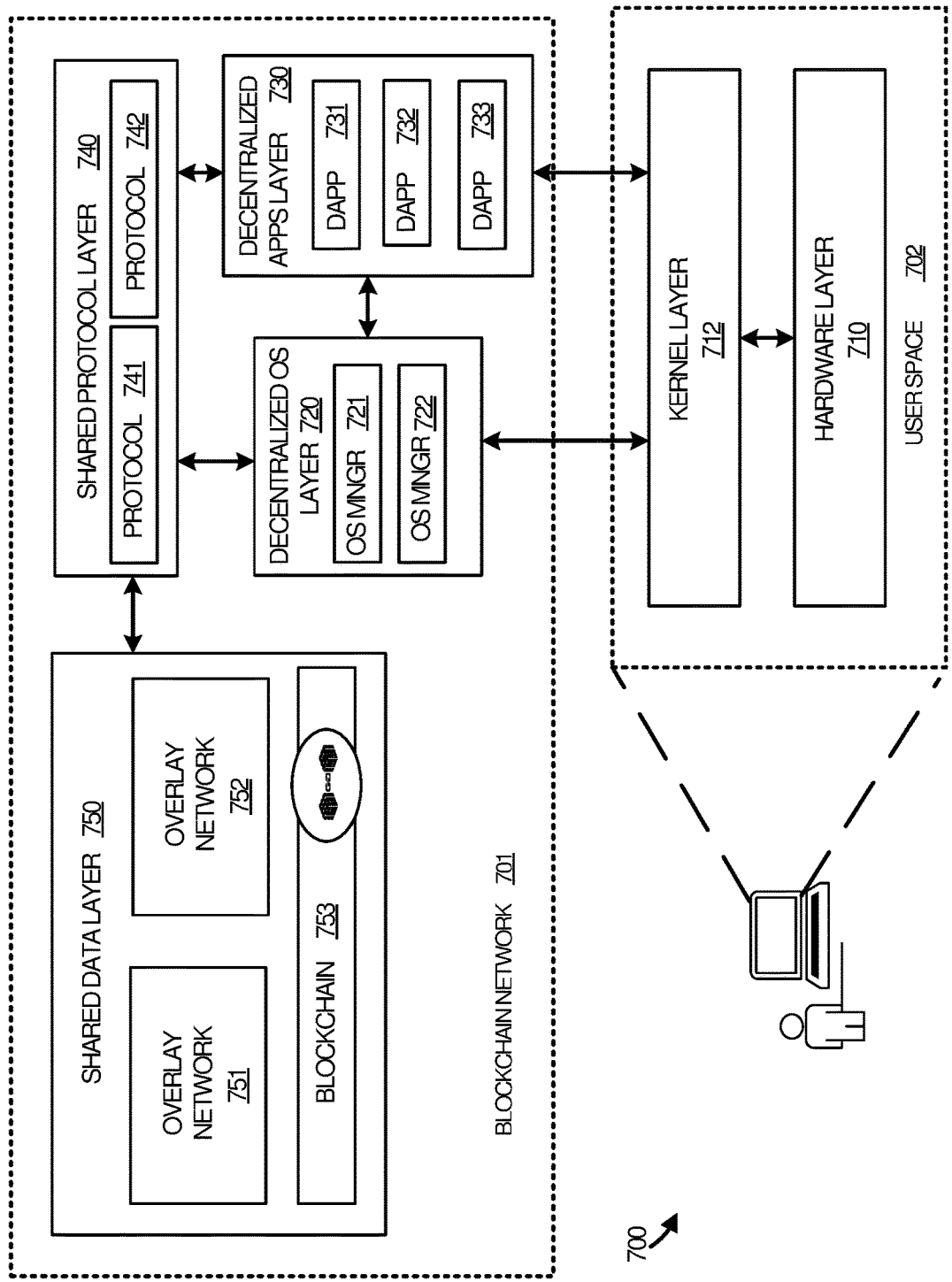
FIG. 7 illustrates various components of a distributed node network in an implementation of an enhanced blockchain operating system to execute decentralized applications.

FIG. 7 illustrates various components of a distributed node network in an implementation of an enhanced application to execute decentralized applications using a blockchain operating system. Blockchain environment 700 includes blockchain network 701 and user space 702. Blockchain network 701 includes decentralized operating system layer 720 which comprises various operating system managers 721-722. Blockchain network 701 also include decentralized application layer 730 comprising DApps 731-733.

Blockchain network 701 further includes shared protocol layer 740 and shared data layer 750. Shared protocol layer 730 includes protocols 741-742. Shared data layer 750 includes network overlays 751-752 and blockchain 753. Each of the layers and their associated components are described further herein.

User space 702 includes hardware layer 710 and kernel layer 712. Hardware layer 710 allows the operating system to interact with a hardware device in user space 702. For example, a program instruction may be called from kernel 712 or from a device driver to perform operations of the user device. Hardware layer 710 may include various components to support hardware-specific routines from the core operating system. Components include CPUs, memory and storage systems, device drivers, etc. Hardware layer 710 is configured to interface with kernel layer 712.

Kernel layer 712 includes lower level core operating system components to perform various functions, such as communications, protection, processor control, etc. Kernel layer 712 may include a hardware abstraction layer, device drivers, interrupt handlers, boot and init, file systems. A memory manager, process manager, and network support. Kernel layer 712 also includes a system call interface to receive calls from decentralized operating system 720 and decentralized applications 730.

It should be noted that while kernel layer 712 may include various operating system modules, decentralized operating system 720 may further include the same or additional operating system modules. For example, kernel layer 712 may include a page manager and a console manager to implement memories and consoles for each process, and decentralized operating system 720 may include device managers and job managers to handle devices, provide buffering, and execute decentralized applications 730. In some embodiments, kernel layer 712 may be configured to interface with decentralized operating system layer 720 and decentralized application layer 730.

Decentralized operating system layer 720 includes core operating system functionalities, such a file system, scheduler, system calls, paging processes, networking modules, threads, and the like. It should be noted that decentralized operating system layer 720 may also include lower level operating system functionalities, such as communications, protection, processor controls, etc. Operating system managers 721-722 may perform a variety of operations including resource scheduling, memory management, database systems, interrupts, debugging and recovery processes, and the like. Decentralized operating system layer 720 may also be configured to generate operating system APIs and/or pointers which may be transmitted to user space 702.

It should be understood that decentralized operating system layer 720 may be implemented on any number of computing systems or server nodes included in or interacting with blockchain network 701. For example, one or more portions of decentralized operating system layer 720 may be implemented in a cloud-based computing environment. Additionally, one or more portions of decentralized operating system layer 720 may be implemented on a sever node external to blockchain network 701 but which exchanges operating system and application instructions with various components within blockchain network 701.

Decentralized application layer 730 is connected to decentralized operating system layer 720 and shared protocol layer 740. Decentralized application layer 730 may also interface with user space 702 via kernel layer 712. Decentralized application layer 730 is configured to host plurality of DApps 731-733. Decentralized application layer 730 may also be configured to generate DApp APIs. DApps 731-733 may include various applications built upon and processed using blockchain network 701. Example DApps may include a gaming and betting application, voting applications, wallet and other monetary management applications, etc. In some examples scenarios, the DApps may include database access applications, text processing applications, music and video storage and streaming applications, search engine applications, and other user applications.

Shared protocol layer 730 is connected to decentralized operating system layer 720, decentralized application layer 730, and shared data layer 750. Shared protocol layer 730 may be configured to receive a transactional request for an executable instruction stored in one of the plurality of block entries in blockchain 753 on shared data layer 750. The transactional request may in some instances include a keypair code. Shared protocol layer 740 may perform the validation of the transactional request for the executable instruction based on the key-pair code and the associated validation data of the block entry. Shared protocol layer 740 can be configured to execute the executable instructions associated of the block entry to generate shared protocols. The shared protocols can then be used to build a plurality of decentralized applications and decentralized operating systems.

Shared data layer 750 can be configured to store validated transactions in blockchain 753. The validated transactions may comprise a plurality of block entries including executable instructions and associated validation data. Shared data layer 750 can include servers which may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes. Shared data layer 750 can also include overlay networks 751-752 to connect and share communications with each of the server nodes and computing devices interacting with blockchain 753 in blockchain network 701.

Figure 8:
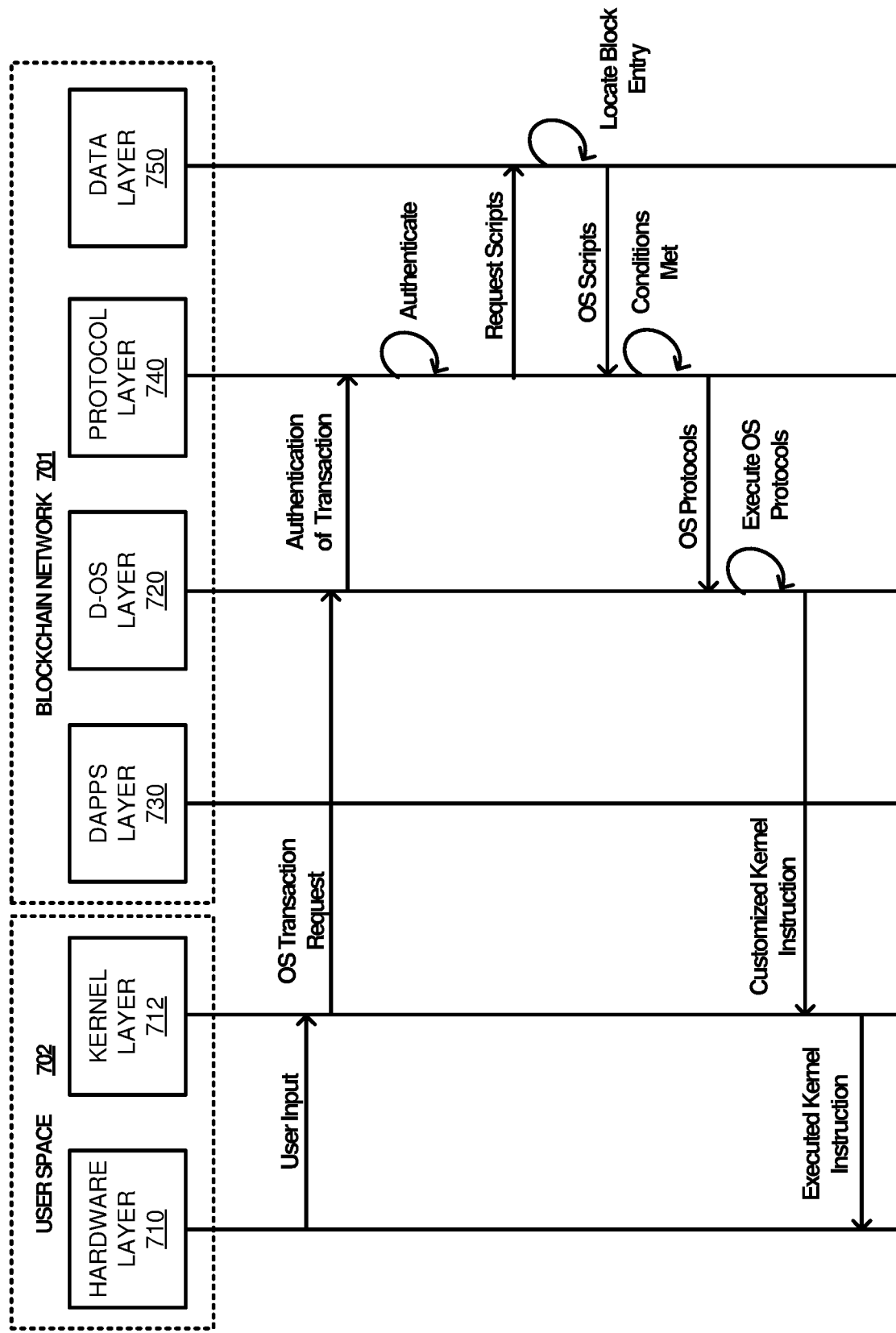
FIG. 8 illustrates a sequence diagram showing an example of a set of communications between various components in an implementation of a blockchain operating system to execute decentralized applications.

FIG. 8 illustrates a sequence diagram in an implementation of a blockchain operating system to execute decentralized applications using a blockchain operating system as shown in FIG. 7. In the embodiments illustrated in FIG. 8, hardware layer 710 receives a user input and transfers an operating system transaction request to kernel layer 712. Kernel layer 712 transfers the operating system transaction request to decentralized operating system layer 720. The operating system transaction request can then be authenticated by shared protocol layer 740. Once the operating system transaction request is authenticated, shared protocol layer 740 can request the operating system scripts from shared data layer 750. In response, shared data layer 750 locates the block entry comprising the operating system scripts from blockchain 753 and can transfer the operating system scripts to shared protocol layer 740.

Once shared protocol layer 740 determines that the conditions for accessing and executing the operating system scripts are met based on data included in the operating system transaction request and other data associated with the user of user space 702, share protocol layer 740 can provide decentralized operating system layer 720 the operating system protocols. In response, decentralized operating system layer 720 executes the operating system protocols and generates a customized kernel instruction. The customized kernel instruction is then transferred to kernel layer 712 in user space 702 for execution. In a final operation, kernel layer 712 processes the customized kernel instruction and transfers the executed kernel instruction to hardware layer 710.

Figure 9:
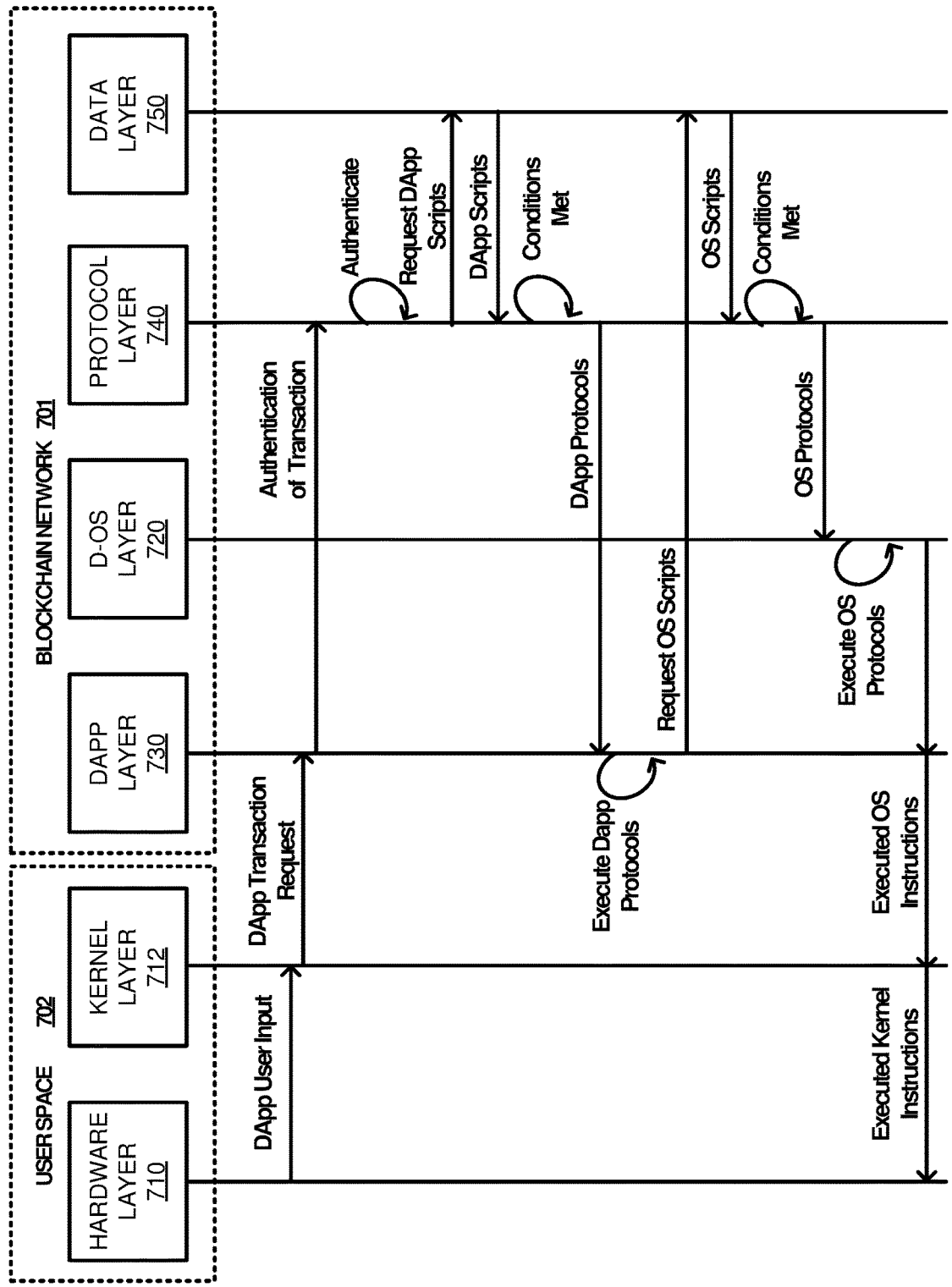
FIG. 9 illustrates an alternative sequence diagram showing an example of a set of communications between various components in an implementation of a block chain operating system to execute decentralized applications.

FIG. 9 illustrates an alternative sequence diagram in an implementation of a blockchain operating system to execute decentralized applications using a blockchain operating system as shown in FIG. 7. The embodiments illustrated in FIG. 9, hardware layer 710 receives a user input and transfers a decentralized application transaction request to kernel layer 712. Kernel layer 712 transfers the decentralized application transaction request to decentralized application layer 730. The decentralized application transaction request is then authenticated by shared protocol layer 740. Once the decentralized application transaction request is authenticated, shared protocol layer 740 requests the decentralized application scripts from shared data layer 750. In response, shared data layer 750 locates the block entry comprising the decentralized application scripts from blockchain 753 and transfers the decentralized application scripts to shared protocol layer 740.

Once shared protocol layer 740 determines that the conditions for accessing and executing the decentralized application scripts are met based on data included in the decentralized application transaction request and other data associated with the user of user space 702, share protocol layer 740 provides decentralized application layer 730 the decentralized application protocols. In response, decentralized application layer 730 executes the decentralized application protocols and generates request for operating system scripts from shared data layer 750.

In response, shared data layer 750 locates the block entry comprising the operating system scripts from blockchain 753 and transfers the operating system scripts to shared protocol layer 740. Shared protocol layer 740 determines that the conditions for accessing and executing the operating system scripts are met and provides decentralized operating system layer 720 the operating system protocols. In response, decentralized operating system layer 720 executes the operating system protocols and transfers the executed operating system instructions to kernel layer 712 in user space 702 over decentralized application layer 730 (which received the decentralized application transaction request). In a final operation, kernel layer 712 processes the operating system instructions and transfers executed kernel instructions to hardware layer 710.

FIG. 10 illustrates a block diagram illustrating an example machine representing the computer systemization of the host computer system. Controller 1000 may be in communication with entities including one or more users 1025 client/terminal devices 1020, user input devices 1005, peripheral devices 1010, optional co-processor device(s) (e.g., cryptographic processor devices) 1015, and networks 1030. Users may engage with controller 1000 via terminal devices 1020 over networks 1030. In some embodiments, all or a portion of the communications between terminal devices 1020 and controller 1000 can be encrypted. Various laws, standards, or best practices may require cryptography for storing, transmitting, and/or utilization of various types data, information, code, signaling, etc.

Computers may employ central processing units (CPUs) or processors to process information. Processors may include programmable general-purpose or special-purpose microprocessors, programmable controllers, application-specific integrated circuits (ASICs), programmable logic devices (PLDs), embedded components, a combination of such devices and the like. Processors execute program components in response to user and/or system-generated requests. One or more of these components may be implemented in software, hardware or both hardware and software. Processors pass instructions (e.g., operational and data instructions) to enable various operations.

Controller 1000 may include clock 1065, CPU 1070, memory such as read only memory (ROM) 1085 and random access memory (RAM) 1080 and co-processor 1075 among others. These controller components may be connected to a system bus 1060, and through the system bus 1060 to an interface bus 1035. Further, user input devices 1005, peripheral devices 1010, co-processor devices 1015, and the like, may be connected through the interface bus 1035 to the system bus 1060. The interface bus 1035 may be connected to a number of interface adapters such as processor interface 1040, input output interfaces (I/O) 1045, network interfaces 1050, storage interfaces 1055, and the like.

Processor interface 1040 may facilitate communication between co-processor devices 1015 and co-processor 1075. In one implementation, processor interface 1040 may expedite encryption and decryption of requests or data. Input output interfaces (I/O) 1045 facilitate communication between user input devices 1005, peripheral devices 1010, co-processor devices 1015, and/or the like and components of controller 1000 using protocols such as those for handling audio, data, video interface, wireless transceivers, or the like (e.g., Bluetooth®, IEEE 894a-b, serial, universal serial bus (USB), Digital Visual Interface (DVI), 802.11a/b/g/n/x, cellular, etc.). Network interfaces 1050 may be in communication with the network 1030. Through the network 1030, controller 1000 may be accessible to remote terminal devices 1020. Network interfaces 1050 may use various wired and wireless connection protocols such as, direct connect, Ethernet, wireless connection such as IEEE 802.11a-x, miracast and the like. Some components of the interactive gaming system may include various protocols or comply with various standards or certifications set forth by different associations or regulatory agencies. For example, some embodiments may use the slot accounting system (SAS) protocol or comply with the game to system (G2S) standard.

Examples of network 1030 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1050 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities.

The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, nextgeneration firewall, personal firewall, etc., without deviating from the novel art of this disclosure. It should be appreciated that controller 1000 may be capable of using network interfaces 1050 to transfer and receive payment amounts. The payment may be driven by an application executed by controller 1000, such as a National Fighting Club (NFC) application tap using Bluetooth®.

Storage interfaces 1055 may be in communication with a number of storage devices such as, storage devices 1090, removable disc devices, and the like. The storage interfaces 1055 may use various connection protocols such as Serial Advanced Technology Attachment (SATA), IEEE 894, Ethernet, Fiber, Universal Serial Bus (USB), and the like.

User input devices 1005 and peripheral devices 1010 may be connected to I/O interface 1045 and potentially other interfaces, buses and/or components. User input devices 1005 may include card readers, fingerprint readers, joysticks, keyboards, microphones, mouse, remote controls, retina readers, touch screens, sensors, and/or the like. Peripheral devices 1010 may include antenna, audio devices (e.g., microphone, speakers, etc.), cameras, external processors, communication devices, radio frequency identifiers (RFIDs), scanners, printers, storage devices, transceivers, and/or the like. Co-processor devices 1015 may be connected to controller 1000 through interface bus 1035, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. Controller 1000 may employ various forms of memory including on-chip CPU memory (e.g., registers), RAM 1080, ROM 1085, and storage devices 1090. Storage devices 1090 may employ any number of tangible, non-transitory storage devices or systems such as fixed or removable magnetic disk drive, an optical drive, solid state memory devices and other processor-readable storage media. Computer-executable instructions stored in the memory may include an interactive gaming platform having one or more program modules such as routines, programs, objects, components, data structures, and so on that perform particular tasks or implement particular abstract data types. For example, the memory may contain operating system (OS) component 1095, modules and other components, database tables, and the like. These modules/components may be stored and accessed from the storage devices, including from external storage devices accessible through an interface bus 1035.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

Controller 1000 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of controller 1000 may be distributed electronically over the Internet or over other networks (including wireless networks). Those skilled in the relevant art(s) will recognize that portions of the interactive gaming system may reside on a server computer, while corresponding portions reside on a client computer. Data structures and transmission of data particular to aspects of controller 1000 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system comprising:
   one or more non-transitory computer readable storage media;
   one or more processors operatively coupled to the one or more non-transitory computer readable storage media; and
   program instructions stored on the one or more non-transitory computer readable storage media that, when executed by the one or more processors, direct the system to at least:
   receive, from a user device in a distributed network of nodes, a transactional request to generate and store an operating system instruction in one or more blocks of a blockchain, wherein:
      the transactional request comprises an indication of at least one application function to be executed using the operating system instruction,
      the operating system instruction is used for executing operating system processes on the user device, and
      the operating system instruction includes at least one customized instruction to be executed by the user device;
   authenticate the transactional request in the distributed network of nodes based on authentication data associated with the transactional request, wherein the authentication data comprises an identity of the requesting user device;
   in response to authenticating the transactional request, evaluate the blockchain to locate one or more scripts for executing the at least one application function, wherein the one or more scripts are associated with the transactional request and are stored in at least one block of the blockchain;
   execute the one or more scripts to generate and store the operating system instruction in the one or more blocks of the blockchain; and
   transfer the generated operating system instruction to the user device to facilitate execution of the at least one customized instruction by the user device, wherein executing the one or more scripts to facilitate generating the operating system instruction comprises one or more nodes of the distributed network of nodes executing the one or more scripts associated with the transactional request to provide an executed operating system instruction to the user device.

2. The system of claim 1, wherein when executed by the one or more processors, the program instructions further direct system to:
   receive, from another user device in the distributed network of nodes, a transactional request to generate a block of the blockchain comprising the operating system instructions and a set of conditions;
   authenticate the transactional request in the distributed network of nodes based on data associated with the transactional request; and
   store the operating system instruction in the block of the blockchain, wherein the operating system instruction is executed when the set of conditions are met.

3. The system of claim 1, wherein the transactional request for an operating system instruction further comprises an indication of a decentralized application function to be executed using the operating system instruction.

4. The system of claim 3, wherein:
   the one or more scripts associated with the transactional request comprise at least one script associated with the decentralized application function and at least one script associated with the operating system instruction; and
   when executed by the one or more processors to generate the operating system instruction, the program instructions further direct the system to execute the at least one script associated with the decentralized application function and the at least one script associated with the operating system instruction to generate the operating system instruction.

5. The system of claim 1, wherein when executed by the one or more processors to evaluate the blockchain for one or more scripts associated with the transactional request, the program instructions further direct the system to:
   evaluate a smart contract within the blockchain which include the one or more scripts to be executed when the transactional request is authenticated.

6. The system of claim 1, wherein the operating system instruction comprises one or both of:
   at least one customized application programming interface (API) to be executed by the user device; and
   at least one customized API to be executed by a native operating system in the user device.

7. The system of claim 1, wherein:
   the transactional request for the operating system instruction comprises characteristic data associated with the operating system instruction; and
   generate the operating system instruction, the program instructions direct the one or more processors to generate an executed operating system instruction in accordance with the characteristic data associated with the operating system instruction.

8. A method for providing a blockchain operating system, the method comprising:
   receiving, from a user device in a distributed network of nodes, a transactional request to access an operating system instruction stored in one or more blocks of a blockchain, wherein:

the transactional request comprises data for permanent recordation into the blockchain, and the operating system instruction comprises at least one customized application programming interface (API) to be executed by the user device;

authenticating the transactional request in the distributed network of nodes based on authentication data associated with the transactional request, wherein the authentication data comprises authorized access associated with the requesting user device;

after authenticating the transactional request, evaluating the blockchain to locate one or more scripts stored in a block of the blockchain and associated with the transactional request;

executing the one or more scripts to facilitate generating the operating system instruction based on the one or more scripts; and transferring the generated operating system instruction to the user device from the distributed network of nodes to facilitate execution of the at least one customized API by the user device, wherein executing the one or more scripts to facilitate generating the operating system instruction comprises one or more nodes of the distributed network of nodes executing the one or more scripts associated with the transactional request to provide an executed operating system instruction to the user device.

9. The method of claim 8, further comprising:
receiving, from another user device in the distributed network of nodes, a transactional request to generate a block of the blockchain comprising the operating system instructions and a set of conditions;

authenticating the transactional request in the distributed network of nodes based on data associated with the transactional request; and storing the operating system instruction in the block of the blockchain, wherein the operating system instruction is executed when the set of conditions are met.

10. The method of claim 8, wherein the transactional request for an operating system instruction further comprises an indication of a decentralized application function to be executed using the operating system instruction.

11. The method of claim 10, wherein:
the one or more scripts associated with the transactional request comprises at least one script associated with the decentralized application function and at least one script associated with the operating system instruction; and generating the operating system instruction comprises executing the at least one script associated with the decentralized application function and the at least one script associated with the operating system instruction to generate the operating system instruction.

12. The method of claim 8, wherein:
evaluating the blockchain for one or more scripts associated with the transactional request comprises evaluating a smart contract within the blockchain which includes the one or more scripts to be executed when the transactional request is authenticated.

13. The method of claim 8, wherein the operating system instruction comprises one or both of:
at least one customized instruction to be executed by the user device; and
at least one customized API to be executed by a native operating system in the user device.

14. The method of claim 8, wherein:
the transactional request for the operating system instruction comprises characteristic data associated with the operating system instruction; and
generating the operating system instruction comprises generating an executed operating system instruction in accordance with the characteristic data associated with the operating system instruction.

15. A method for providing a blockchain operating system, the method comprising:
receiving, from a user device in a distributed network of nodes, a transactional request for a decentralized application instruction which is used for executing at least one application function on the user device, wherein the transactional request is received by a decentralized application layer of the blockchain operating system;

authenticating, by a shared protocol layer of the blockchain operating system, the transactional request in the distributed network of nodes based on authentication data associated with the transactional request;

in response to authenticating the transactional request, evaluating, by the shared protocol layer, a blockchain to locate the one or more decentralized application scripts stored in a block entry of a shared data layer of the blockchain operating system and associated with the transactional request;

executing the one or more scripts to facilitate generating the operating system instruction based on the one or more scripts; and transferring, by the decentralized operating system layer, executed operating system instructions to the user device to facilitate processing of the operating system instructions by the user device, wherein executing the one or more scripts to facilitate generating the operating system instruction comprises one or more nodes of the distributed network of nodes executing the one or more scripts associated with the transactional request to provide an executed operating system instruction to the user device.

16. The method of claim 15, wherein the operating system instructions include at least one of:
one or more resource scheduling instructions;
one or more user authentication instructions;
one or more decentralized application communication instructions;
one or more user account synchronization instructions; and
one or more database query instructions.

17. The method of claim 15, wherein the transactional request includes data indicative of conditions for accessing and executing one or more decentralized application scripts, and wherein the method further comprises:
in response to locating the one or more decentralized application scripts, transferring, by the shared data layer, the one or more decentralized application scripts to the shared protocol layer;
determining, by the shared protocol layer and based on the data indicative of conditions, that conditions for accessing and executing the decentralized application scripts are met; and
in response to determining that the conditions for accessing and executing the decentralized application scripts are met, providing, by the shared protocol layer, decentralized application protocols to the decentralized application layer.

18. The method of claim 17, further comprising:
after providing the decentralized application protocols to the decentralized application layer:
- executing, by the decentralized application layer, the decentralized application protocols; and
- generating, by the decentralized application layer, a request for one or more operating system scripts from the shared data layer;

in response to generating the request for the one or more operating system scripts, evaluating, by the shared data layer, the blockchain to locate the one or more operating system scripts associated with the decentralized application instruction and stored in a block entry of the shared data layer; and in response to locating the one or more operating system scripts, transferring, by the shared data layer, the one or more operating system scripts to the shared protocol layer.

19. The method of claim 18, wherein the transactional request includes data indicative of conditions for accessing and executing the one or more operating system scripts, and wherein the method further comprises:
- determining, by the shared protocol layer and based on the data indicative of conditions, that conditions for accessing and executing the one or more operating system scripts are met;
- in response to determining that the conditions for accessing and executing the one or more operating system scripts are met, providing, by the shared protocol layer, operating system protocols to a decentralized operating system layer of the blockchain operating system; and
- after providing the operating system protocols to the decentralized application layer, executing, by the decentralized operating system layer, the operating system protocols.

* * * * *